United States Patent
Xie et al.

(10) Patent No.: US 9,456,213 B2
(45) Date of Patent: Sep. 27, 2016

(54) METHOD FOR SIMULTANEOUSLY ENCODING MACROBLOCK GROUPS OF FRAME

(71) Applicant: ArcSoft Hangzhou Co., Ltd., Hangzhou, Zhejiang Province (CN)

(72) Inventors: YaGuang Xie, Hangzhou (CN); Jin Huang, Hangzhou (CN); JunQing Wan, Hangzhou (CN)

(73) Assignee: Hangzhou Danghong Technology Co., Ltd., Hangzhou (CN)

( * ) Notice: Subject to any disclaimer, the term of this patent is extended or adjusted under 35 U.S.C. 154(b) by 386 days.

(21) Appl. No.: 13/944,848

(22) Filed: Jul. 17, 2013

(65) Prior Publication Data
US 2015/0023417 A1     Jan. 22, 2015

(51) Int. Cl.
*H04N 19/00* (2014.01)
*H04N 19/436* (2014.01)

(52) U.S. Cl.
CPC .................... *H04N 19/436* (2014.11)

(58) Field of Classification Search
CPC .................................. H04N 19/436
USPC .................................. 375/240.12
See application file for complete search history.

(56) References Cited

U.S. PATENT DOCUMENTS

| | | | | |
|---|---|---|---|---|
| 2007/0019721 A1* | 1/2007 | Le Leannec | ........... | H04N 19/63 375/240.1 |
| 2007/0098276 A1* | 5/2007 | Reese | ........... | H04N 19/91 382/234 |
| 2007/0140345 A1* | 6/2007 | Osamoto | ........... | H04N 19/51 375/240.16 |
| 2007/0230811 A1* | 10/2007 | Lee | ........... | H04N 19/70 382/244 |
| 2007/0291846 A1* | 12/2007 | Hussain | ........... | H04N 19/56 375/240.16 |
| 2008/0031329 A1* | 2/2008 | Iwata | ........... | H04N 19/176 375/240.12 |
| 2011/0058610 A1* | 3/2011 | Van Beek | ........... | H04N 19/198 375/240.16 |

OTHER PUBLICATIONS

Richardson, The H.264 Advanced Video Compression Standard, Second Edition (ISBN-13:978-0470516928), Aug. 8, 2010.

* cited by examiner

*Primary Examiner* — Jeffery Williams
(74) *Attorney, Agent, or Firm* — Winton Hsu; Scott Margo

(57) ABSTRACT

A first frame associated with a video stream is in a prior sequence than a second frame of the video stream. Each of the first frame and the second frame has a plurality of groups, and each of the groups contains a plurality of macroblocks. A plurality of encoding procedures of the groups of the second frame are simultaneously performed to encode the second frame into a plurality of strings of data, and encoded data of the second frame is outputted by the encoder according to the strings of data. Since a plurality of groups of the macroblocks in the second frame are simultaneously encoded, the encoder has a high efficiency of encoding the video stream.

13 Claims, 3 Drawing Sheets

METHOD FOR SIMULTANEOUSLY ENCODING MACROBLOCK GROUPS OF FRAME

BACKGROUND OF THE INVENTION

1. Field of the Invention

The invention is related to a method for encoding frames, and more particularly to a method for simultaneously encoding groups of macroblocks of one of frames according to H.264 algorithm.

2. Description of the Prior Art

Video compression (or video encoding) is an essential technology for applications such as digital television, DVD-Video, mobile TV, videoconferencing and internet video streaming. Video compression is a process of converting digital video into a format suitable for transmission or storage, while typically reducing the number of bits.

H.264 is an industry standard for video compression, the process of converting digital video into a format that takes up less capacity when it is stored or transmitted. An H.264 video encoder carries out prediction, transform and coding processes to produce a compressed H.264 bitstream (i.e. syntax). During the prediction processes, the encoder processes frames of video in units of a macroblock and forms a prediction of the current macroblock based on previously-coded data, either from the current frame using intra prediction or from other frames that have already been coded using inter prediction.

Since the prediction processes for each frame are successively performed, the predictions of the macroblocks of the current frame would be generated one by one. Therefore, if every frame has numerous macroblocks, the video encoding would be time-consuming.

SUMMARY OF THE INVENTION

According to an exemplary embodiment of the claimed invention, a method for simultaneously encoding groups of macroblocks of one of frames by an encoder is disclosed. A first frame associated with the video stream is in a prior sequence than a second frame of the video stream. Each of the first frame and the second frame comprises a plurality of groups, and each of the groups contains m×n macroblocks arranged in m rows and n columns, m and n are integers greater than 1. The method comprises simultaneously performing a plurality of encoding procedures of the groups of the second frame to generate a plurality of strings of data, and outputting encoded data of the second frame by the encoder according to the strings of data. Each of the encoding procedures is configured to encode a corresponding one target group of the groups of the second frame. Each of the encoding procedures comprises performing a plurality of macroblock comparison procedures of the target group to generate a plurality of sub-strings of data, and generating one of the strings of data according to the sub-strings of data. Each macroblock comparison procedure is configured to compare a corresponding one target macroblock of the m×n macroblocks of the target group with each macroblock of a macroblock set associated with the target macroblock, and the macroblock set comprises a reference macroblock of a reference group of the first frame.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
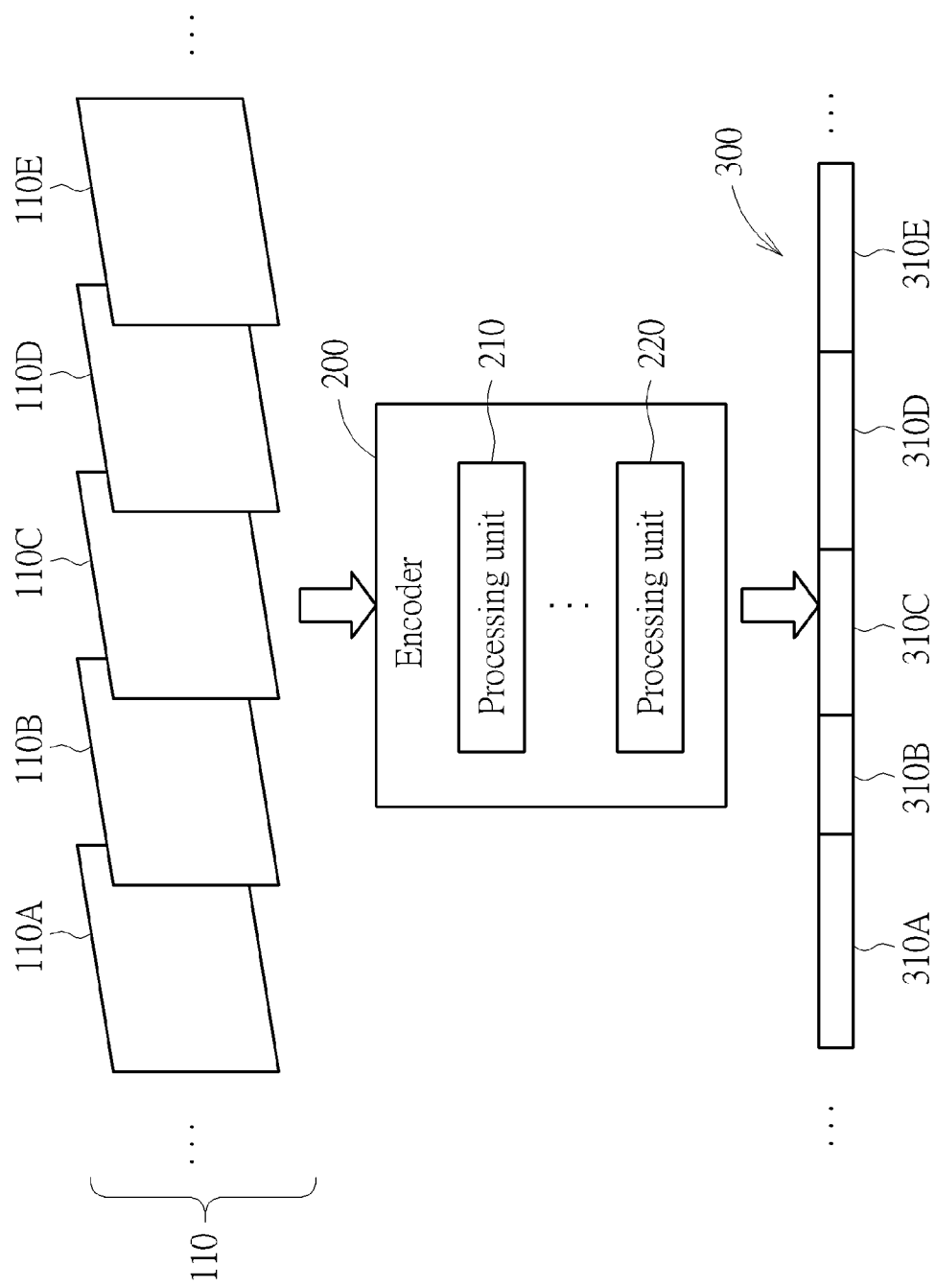
FIG. 1 illustrates an encoder encoding a video stream to output a bitstream according to the present invention.

Please refer to FIG. 1. FIG. 1 illustrates an encoder 200 encoding a video stream 100 to output a bitstream 300 according to the present invention. The video stream 100 comprises a plurality of frames (e.g. frames 110A to 110E), and each of the frames of the video stream 100 contains a plurality of pixels for displaying an image. The encoder 200 may receive the video stream 100 from an electronic apparatus, for example a video camera, a DVD player, a television, a set top box, a file server, etc. However, the present invention is not limited thereto. Each of the frames 110A to 110E is encoded into a corresponding one of encoded units 310A to 310E of the bitstream 300.

The encoder 200 may encode (or compress) the frames of the video stream 100 into a format that takes up less capacity when it is stored or transmitted. For example, a sequence of the video of the video stream 100 may be encoded into the H.264 format, and the bitstream 300 may be compatible with the H.264 syntax. In this case, the encoded units 310A to 310E of the bitstream 300 are network adaptation layer (NAL) units of the H.264 syntax.

Figure 2:
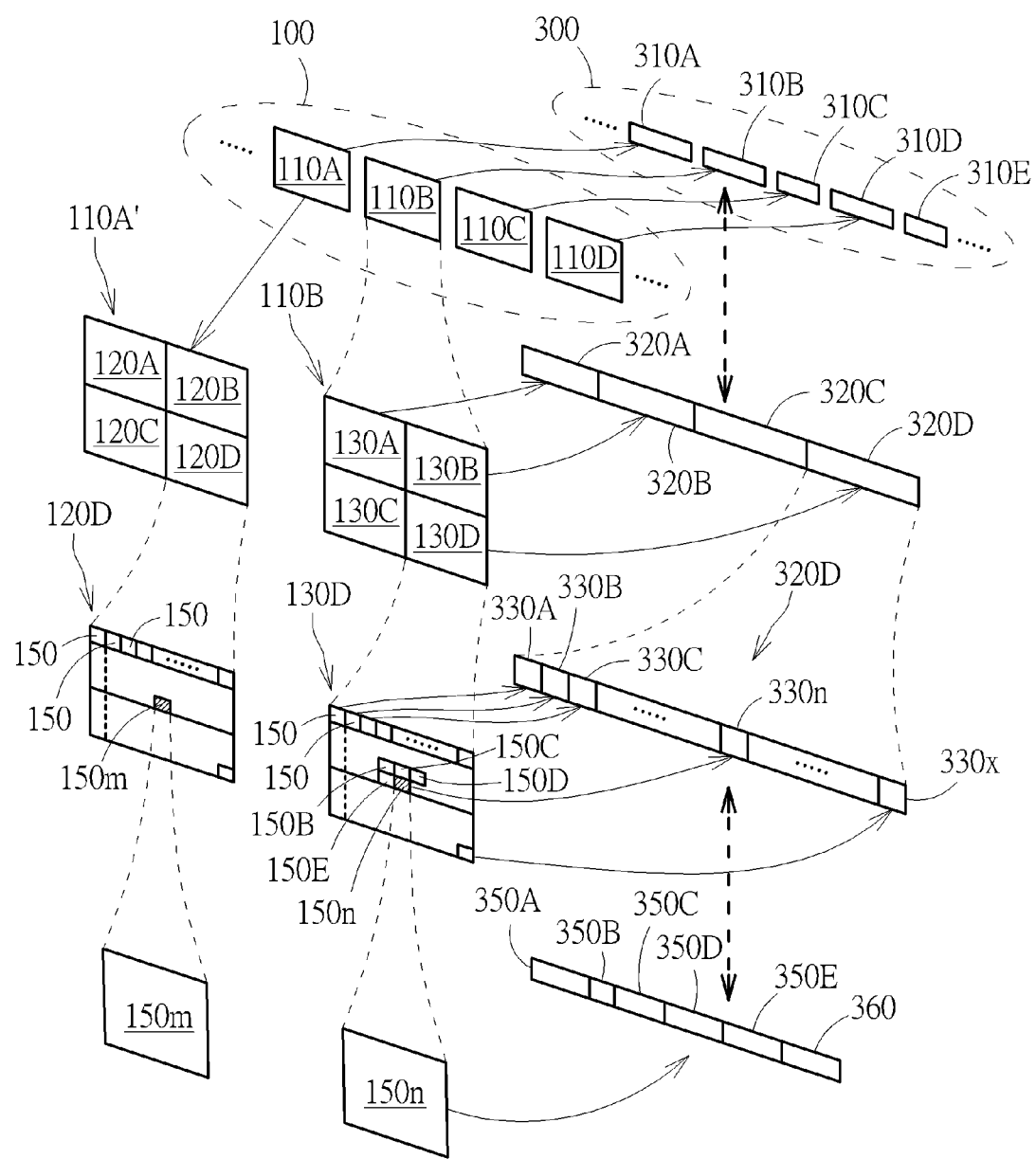
FIG. 2 illustrates an overview of the structures of the video stream and the bitstream.

Please refer to FIG. 2. FIG. 2 illustrates an overview of the structures of the video stream 100 and the bitstream 300. The video stream 100 comprises frames 110A and 110B. The encoder 200 encodes the frames 110A and 110B into the encoded units 310A and 310B of the bitstream 300 respectively. As well as encoding the frame 110A as part of the bitstream 300, the encoder 300 reconstructs the frame 110A, i.e. creates a copy of a decoded frame 110A' according to relative encoded data of the frame 110A. This reconstructed copy may be stored in a coded picture buffer (CPB) and used during the encoding of further frames (e.g. the frame 110B). Accordingly, before the encoder 200 encodes the frame 110B, the frame 110A may be encoded and reconstructed into the frame 110A', such that the frame 110A' would be used as a reference frame while encoding the frame 110B. Since the frame 110A is in a prior sequence than the frame 110B, the frame 110A' is also in a prior sequence than the frame 110B.

The encoder 200 uses the frame 110A' to carry out prediction processes of the frame 110B to produce predictions of the frame 110B when encoding the frame 110B, such that the encoded unit 310B of the frame 110B may have a less data amount due to the predictions. During the prediction processes, the encoder 200 processes the frame 110B in units of a macroblock (typically 16×16 pixels) and forms a prediction of the current macroblock based on previously-coded data, either from a previous frame (e.g. the frame 110A') that have already been coded using inter prediction and/or from the current frame (e.g. the frame 110B) using intra prediction. The encoder 200 accomplishes one of the prediction processes by subtracting the prediction from the current macroblock to form a residual1 macroblock.

The macroblocks 150 of the frames 110A' and 110B are respectively separated into four groups 120A to 120D and 130A to 130D. The resolutions of the groups 120A to 120D and 130A to 130D are identical. Each of the groups 120A to 120D and 130A to 130D contains a plurality of macroblocks 150, and the macroblocks 150 of each group are arranged in m rows and n columns, where m and n are integers greater than 1. It should be noted that the number of the groups in each frame may be a number other than four, and the present invention is not limited thereto. For example, the number of the groups in each frame may be 2, 6, 8, 16, etc. For the sake of encoding efficiency of the encoder 200, the number of the groups in each frame could be determined based on the architecture of the encoder 200 and/or the resolution of the frames 110A' and 110B. In addition, the integers m and n could be determined if the number of the groups of each frame 110A' or 110B and the resolution of the frame 110A' or 110B are known.

When the encoder 200 encodes the image 110B, the groups 130A to 130D of the image 110B are simultaneously encoded by the encoder 200. In other words, the encoder 200 simultaneously performs a plurality of encoding procedures of the groups 130A to 130D to encode the groups 130A to 130D into strings of data 320A to 320D. In the embodiment, since the second frame has four groups 130A to 130D, the encoder 200 simultaneously performs four encoding procedures to respectively encode the groups 130A, 130B, 130C and 130D into the strings of data 320A, 320B, 320C and 320D. Therefore, the strings of data 320A to 320D are generated synchronously. Due to parallel execution of a plurality of encoding procedures, the encoder 200 has a high efficiency for encoding the video stream 100.

When one of the encoding procedures is performed to encode a target group of the groups 130A to 130D, the encoder 200 successively performs a plurality of macroblock comparison procedures of the target group to generate a plurality of sub-strings of data and generates one of the strings of data according to the sub-strings of data. For instance, when the encoder 200 performs the encoding procedure to encode the group 130D, a plurality of macroblock comparison procedures of the group 130D are performed to generate a plurality of sub-strings of data 330A to 330x, and the string of data 320D would be generated according to the sub-strings of data 330A to 330x. Each of the sub-strings of data 330A to 330x is generated by performing one of the macroblock comparison procedures of a corresponding macroblock 150 of the group 130D. Take the sub-string of data 330n for example, the sub-string of data 330n is generated by performing the macroblock comparison procedure of the macroblock 150n.

Each of the macroblocks 150 of the frame 110B is associated with a macroblock set. The encoder 200 forms a prediction of each macroblock 150 based on the macroblock set of the macroblock 150. For example, the macroblock set of the macroblock 150n comprises at least a reference macroblock 150m of a reference group 120D in the frame 110A'. The reference macroblock 150m and the target macroblock 150n have the same coordinates in the frames 110A' and 110B. Therefore, the reference macroblock 150m may be used for inter prediction of the macroblock 150n. The macroblock set of the macroblock 150n may further comprise one or more macroblocks neighboring to the macroblock 150n in the group 130D. Therefore, one or more macroblocks belonged to the group 130D and neighboring to the macroblock 150n may be used for intra prediction of the macroblock 150n.

Figure 3:
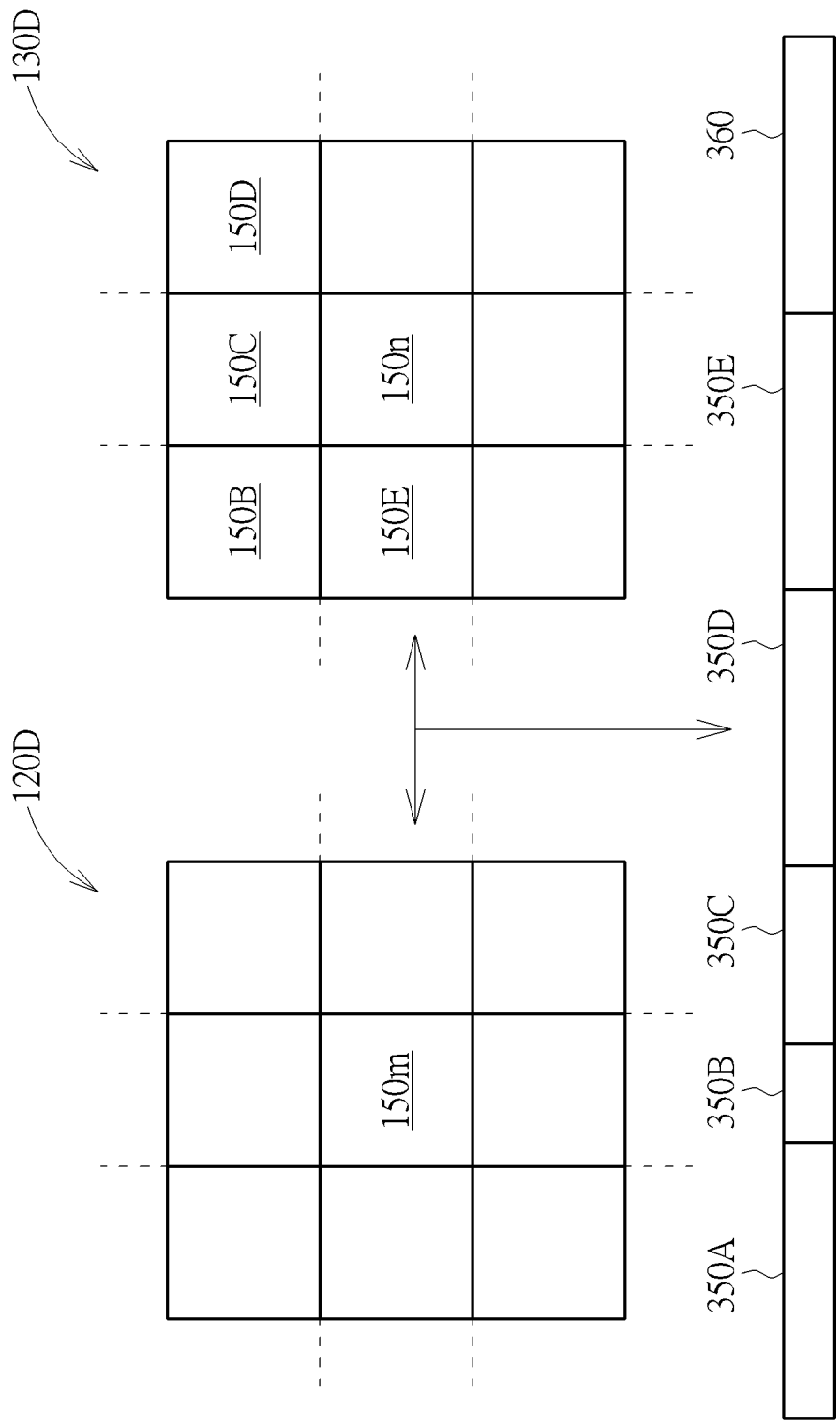
FIG. 3 illustrates the encoder performing a macroblock comparison procedure to compare a target macroblock of a group of a second frame with each macroblock of a macroblock set associated with the target macroblock.

The number of the macroblocks of the macroblock set of each macroblock 150 could be determined based on the coordinates of the macroblock 150 in a corresponding group. The macroblock 150n in the group 130D will be taken for an example in the following descriptions. Please refer to FIG. 3. FIG. 3 illustrates the encoder 200 performing a macroblock comparison procedure to compare the macroblock 150n with each macroblock of the macroblock set of the macroblock 150n. If the macroblock 150n is not in the first row, the first column or the last column of the group 130D, the macroblock set of the macroblock 150n further comprises a macroblock 150B at the upper left corner of the macroblock 150n, a macroblock 150C above the macroblock 150n, a macroblock 150D at the upper right corner of the macroblock 150n, and a macroblock 150E at a left side of the macroblock 150n. However, if the macroblock 150n is in the first row of the group 130D, the macroblock set of the macroblock 150n does not comprise the macroblocks 150B, 150C and 150D, but the macroblock set of the macroblock 150n comprises the macroblock 150E. If the macroblock 150n is in the first column of the group 130D, the macroblock set of the macroblock 150n does not comprise the macroblocks 150B and 150E, but the macroblock set of the macroblock 150n comprises the macroblocks 150C and 150D. If the macroblock 150n is in the last column of the group 130D, the macroblock set of the macroblock 150n does not comprise the macroblock 150D, but the macroblock set of the macroblock 150n comprises the macroblocks 150B, 150C and 150E. In other words, if the macroblock 150n is a macroblock other than the macroblock in the first row and the first column of the group 130D, the macroblock set of the macroblock 150n further comprises one or more macroblocks selected from macroblocks neighboring to the macroblock 150n in the group 130D. Since the macroblocks 150B, 150C, 150D and 150E are neighboring to the macroblock 150n, the macroblocks 150B, 150C, 150D and 150E could be used for the intra prediction of the macroblock 150n. In an embodiment of the present invention, the macroblocks 150B, 150C, 150D and 150E have been encoded while the encoder 200 encodes the macroblock 150n.

Each of the macroblock comparison procedures of the frame 110B is configured to compare a corresponding one target macroblock of the m×n macroblocks in a corresponding target group of the groups 130A to 130D of the frame 110B with each macroblock of the macroblock set of the target macroblock, and each of the macroblock comparison procedures is also configured to compare the target macroblock with at least one macroblock of the macroblock set of the target macroblock to generate at least one piece of relative data. Please refer to FIG. 2 and FIG. 3. In the embodiment, the macroblock set of the macroblock 150n comprises the macroblocks 150m, 150B, 150C, 150D and 150E. During the macroblock comparison procedure of the macroblock 150n, the macroblocks 150m, 150B, 150C, 150D and 150E are separately compared with the macroblock 150n to generate a plurality of pieces of relative data 350A, 350B, 350C, 350D and 350E respectively. The encoder 200 uses the pieces of relative data 350A, 350B, 350C, 350D and 350E and data 360 of the macroblock 150n to predict the macroblock 150n. When the macroblock comparison procedure of the macroblock 150n is performed, the encoder 200 selects a piece of data with a smallest number of bits from the data 360 of the macroblock 150n and the pieces of relative data 350A, 350B, 350C, 350D and 350E, and generates the sub-string of data 330n according to the selected piece of data with the smallest number of bits. Since the encoder 200 generates the sub-string of data 330n according to the selected piece of data with the smallest number of bits, the sub-string of data 330n takes up less capacity.

In an embodiment, each of the pieces of relative data 350A, 350B, 350C, 350D and 350E may comprise a difference between the data of the macroblock 150n and the data of the macroblock 150m, 150B, 150C, 150D or 150E. In an embodiment, each of the pieces of relative data 350A, 350B, 350C, 350D and 350E may comprise a relative position of the macroblock 150n and the macroblock 150m, 150B, 150C, 150D or 150E. In an embodiment, the data of the macroblock 150n is a grey level of the macroblock 150n.

Please refer to FIG. 1. In an embodiment of the present invention, the encoder 200 comprises a plurality of processing units 210. Each of the processing units 210 is configured to perform one of the encoding procedures at a time and cooperate with other processing units 210 to simultaneously encode the groups in a single frame. During encoding the frame 110B, each of the strings of data 320A to 320D is generated by a corresponding one of the processing units 210.

In an embodiment of the present invention, the encoder 200 is an H.264 video encoder for carrying out prediction, transform and coding processes to produce a compressed H.264 bitstream (i.e. syntax), and each of the macroblock comparison procedures is one of the prediction processes performed according to H.264 algorithm. During the prediction processes, the encoder 200 processes the groups of each frame of the video stream 100 in units of a macroblock and forms a prediction of the current macroblock (e.g. the macroblock 150n) based on previously-coded data, either from the current frame (e.g. the frame 110B) using intra prediction or from a previous frame (e.g. the frame 110A') that have already been coded using inter prediction.

When the strings of data 320A to 320D are generated, the encoder 200 further carries out transform and coding processes of the strings of data 320A to 320D to produce the encoded unit 310B of the bitstream 300. When the transform processes are performed, a block of residual samples is transformed using a 4×4 or 8×8 integer transform, an approximate form of the Discrete Cosine Transform (DCT). The transform outputs a set of coefficients, each of which is a weighting value for a standard basis pattern. The output of the transform, a block of transform coefficients, is quantized, i.e. each coefficient is divided by an integer value. Quantization reduces the precision of the transform coefficients according to a quantization parameter (QP). Typically, the result is a block in which most or all of the coefficients are zero, with a few non-zero coefficients. Setting QP to a high value means that more coefficients are set to zero, resulting in high compression at the expense of poor decoded image quality. Setting QP to a low value means that more non-zero coefficients remain after quantization, resulting in better decoded image quality but lower compression. When the coding processes are performed, a number of values are produced and encoded to form the encoded unit 310B of the bitstream 300. These values may include quantized transform coefficients, information to enable a decoder to re-create the prediction, information about the structure of the compressed data and the compression tools used during encoding, and information about the complete video sequence.

In summary, the present invention provides a method capable of simultaneously encoding groups of macroblocks in a single frame. A plurality of encoding procedures are simultaneously performed by an encoder to encode the groups into strings of data. Since the encoding procedures are simultaneously performed, the encoder according to the present invention has a high efficiency of encoding a video stream.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for simultaneously encoding groups of macroblocks of one of frames of a video stream by an encoder, a first frame associated with the frames of the video stream being in a prior sequence than a second frame of the video stream, each of the first frame and the second frame comprising a plurality of groups, each of the groups containing m×n macroblocks arranged in m rows and n columns, each of the macroblocks being composed of 16×16 pixels, and m and n being integers greater than 1, the video stream being encoded into an H.264 bitstream by the encoder, the method comprising:

simultaneously performing a plurality of encoding procedures of the groups of the second frame to generate a plurality of encoded strings of data, wherein each of the encoding procedures is configured to encode a corresponding one target group of the groups of the second frame into one of the encoded strings and comprises:

performing a plurality of macroblock comparison procedures of the target group to generate a plurality of encoded sub-strings of data, wherein each macroblock comparison procedure is configured to compare a corresponding one target macroblock of the m×n macroblocks of the target group with each macroblock of a macroblock set associated with the target macroblock to generate one of the encoded sub-strings, and the macroblock set comprises a reference macroblock of a reference group of the first frame; and generating one of the encoded strings of data according to the encoded sub-strings of data; and outputting encoded data of the second frame by the encoder according to the encoded strings of data, wherein the encoded data of the second frame is one of network adaptation layer (NAL) units of the H.264 bitstream.

2. The method of claim 1, wherein coordinates of the reference macroblock in the first frame are same as coordinates of the target macroblock in the second frame.

3. The method of claim 1, wherein if the target macroblock is one of the macroblocks of the target group other than a macroblock in a first row of the m rows and a first column of the n columns of the target group, the macroblock set further comprises one or more macroblocks selected from macroblocks neighboring to the target macroblock in the target group.

4. The method of claim 1, wherein the each macroblock comparison procedure is configured to compare the target macroblock with at least one macroblock of the macroblock set to generate at least one piece of relative data, and select a piece of data with a smallest number of bits from data of the target macroblock and the at least one piece of relative data.

5. The method of claim 4, wherein the piece of relative data comprises a difference between the data of the macroblock of the macroblock set and the data of the target macroblock.

6. The method of claim 5, wherein the piece of relative data further comprises a relative position of the macroblock of the macroblock set and the target macroblock.

7. The method of claim 4, wherein the piece of relative data comprises a relative position of the macroblock of the macroblock set and the target macroblock.

8. The method of claim 4, wherein the data of the target macroblock is a grey level of the target macroblock.

9. The method of claim 1, wherein the macroblock set further comprises a macroblock at a left side of the target macroblock, a macroblock at an upper left corner of the target macroblock, a macroblock above the target macroblock, and a macroblock at an upper right corner of the target macroblock.

10. The method of claim 1, wherein the macroblock comparison procedures of the target group are successively performed.

11. The method of claim 1, wherein the macroblock comparison procedures are performed according to H.264 algorithm.

12. The method of claim 1, wherein resolutions of the groups are identical.

13. The method of claim 1, wherein the target group and the reference group have same resolution.

* * * * *